United States Patent
Persson

[15] 3,667,080
[45] June 6, 1972

[54] FLUTE CLEANER FOR TWIST DRILLS

[72] Inventor: Henry Persson, 224 Glenwood Avenue, Bloomfield, N.J. 07003

[22] Filed: Mar. 29, 1971

[21] Appl. No.: 128,740

[52] U.S. Cl. ................................................15/236, 30/347
[51] Int. Cl. ..........................................................B23b 51/00
[58] Field of Search.....................15/236, 104.04, 93, 104, 3; 408/18; 74/459; 10/1 R, 1 B; 30/347

[56] References Cited

UNITED STATES PATENTS

| 2,489,443 | 11/1949 | Williams | 15/236 R |
| 555,139 | 2/1896 | Weile | 15/104 R |

Primary Examiner—Leon G. Machlin
Attorney—Ralph R. Roberts

[57] ABSTRACT

A hand-held flute cleaner for twist drills includes an arm member upon which is mounted a pair of cleaning discs which are freely rotatable around axles carried in the arm. The cleaning discs are preferably made of soft metal such as aluminum or may be of plastic. In the periphery of these discs are spaced cutouts disposed to enter and engage a sharp edge of the flute of the twist drill to scrape the accumulated material from the drill.

6 Claims, 3 Drawing Figures

PATENTED JUN 6 1972

INVENTOR.
HENRY PERSSON
BY
Ralph R. Roberts
AGENT

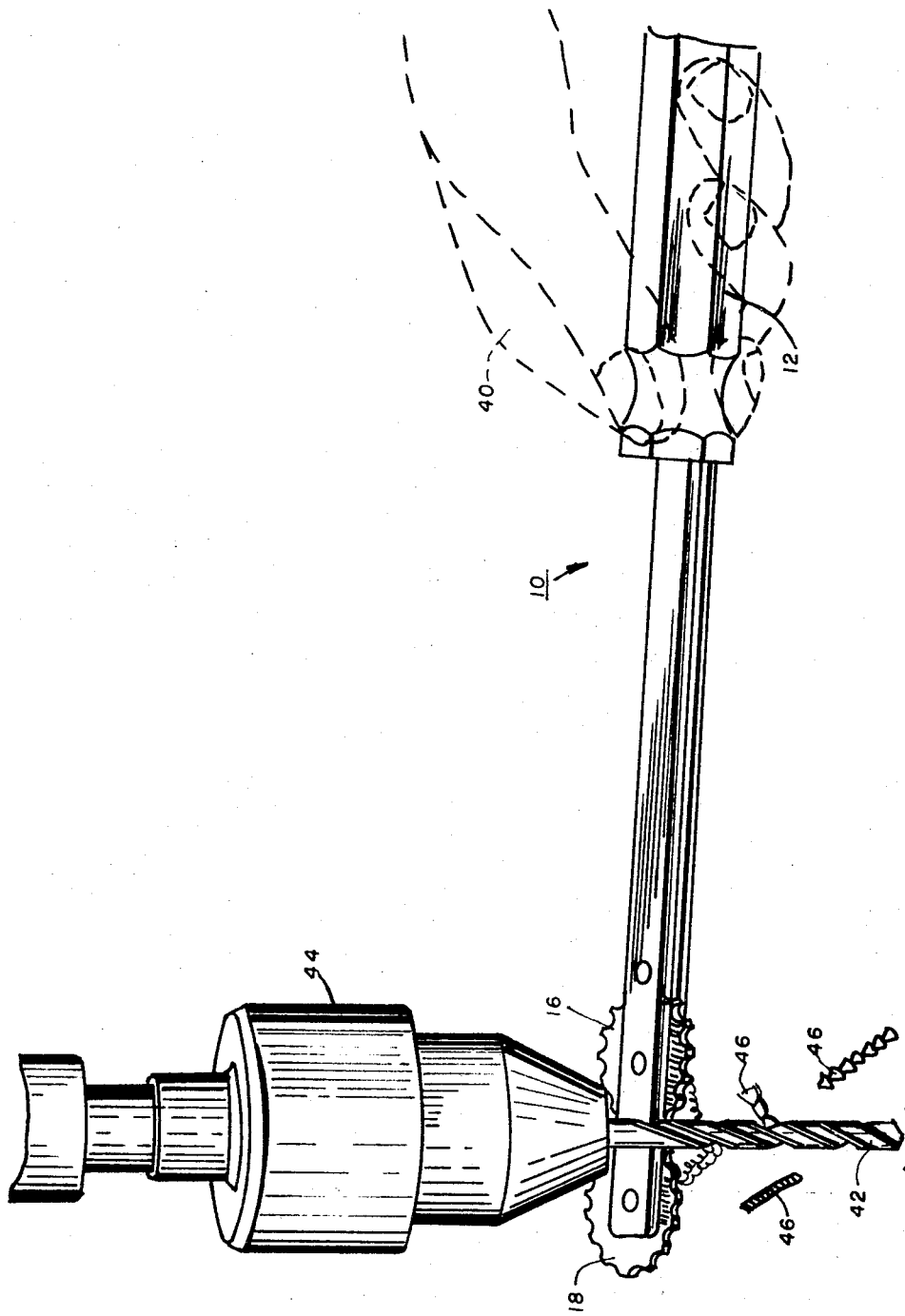

FLUTE CLEANER FOR TWIST DRILLS

BACKGROUND OF THE INVENTION

1. Field of the Invention

With reference to the classification of art as established in the U.S. Patent Office the art to which the present invention pertains is found generally in the class entitled "BRUSHING SCRUBBING AND GENERAL CLEANING" and particularly in the subclass thereunder identified as "scrapers." Pertinent art may also be found in the general class identified as "BORING AND DRILLING" and in particular to the subclass thereunder of "applicances."

2. Description of the Prior Art

In the drilling of holes in metal, plastic and the like where the material being drilled is slightly gummy or sticky in that the material of the workpiece being drilled does not readily slide up the flute of a twist drill it often occurs that the drill as it is fed into the workpiece material to drill the hole has a chip or a portion thereof which adheres to the flute of the drill. If this adhered accumulation in the flute of the drill is not removed, the drill has a tendency to clog or jam in the hole being drilled or the hole may become oversize. When the drill is being run in and with a drill bushing, the adhered material in the drill has a tendency to jam in the bushing and often is twisted off. It is therefore highly desirable that the flutes of the drill be kept clean and free of adhered chips so that the chips may readily pass up the flutes of the drill and so that the drill may cut a clean and true to size hole. Towards this purpose it is often found that lubricants and coatings are applied to the drill surface and particularly to and in the flutes of the drill. Such applications often assist in maintaining the drill in a clean condition, however, in many cases after the drill becomes heated, the application becomes ineffective and chips or material adheres to and in the flute. When this occurs it becomes necessary for the operator to stop the drill press and clean the drill. The flutes of the drill may be cleaned by means of a stick of wood, a sharp edged file, a scraper or the like. When drilling large holes and in particular when drilling brass or copper with holes of extremely large size, the cleaning of the drill may require a stick of wood or the like driven down the flute of the drill.

A chip-breaking device as shown in U.S. Pat. No. 2,669,889 as issued to HULLER on Feb. 23rd, 1954 shows one method of removing chips from the flute of the drill. The deflector member in this device for satisfactory operation must be of hard material such as steel and as such require a determined clearance between the drill and the deflector. This clearance often does not effectively remove accumulated material from the cutting edge of the flute often requiring additional cleaning.

As many or all of these known methods for cleaning the drill require many minutes of productive time on the part of the operator it is an intent of the present invention to provide an easy way of rapidly cleaning the flutes of the drill without the necessity of removing the drill from the chuck of the drill press or shuting down the drill press. The method of cleaning the drill according to the present invention only requires that the flute cleaner be stroked up and down the twist drill as it is rotated by the drill press. This operation requires only a brief period of time such as a minute or two which period of time is essentially the same length of time required to stop the drill press and remove the drill from the chuck.

SUMMARY OF THE INVENTION

The present invention may be summarized at least in part with reference to its objects.

It is an object of the present invention to provide and it does provide, a handheld flute cleaning apparatus in which a pair of disc-shaped scraper members are freely rotatably mounted upon the end of a beam. The scraper members are scalloped in their peripheries so that protruding portions are running and with the scraper member held against the drill the flute cleaner is moved up and down the drill to scrape the accumulated material from the flute of the drill.

In the preferred embodiment, as shown and to be here and after more fully described, it is contemplated that the flute cleaner may be a handheld implement. A conventionally shaped handle has mounted therein a support bar having rotatably mounted on it distal end a pair of rotatable disc-shaped members of soft metal and having cutouts formed in their outer periphery. The discs are of a selected size and the cutouts so spaced as to enable the disc-shaped member to be pushed against the rotating surface of the drill. As it engages the drill, a protruding portion of the disc enters the flute to engage the cutting edge of the drill and provide a scraping member which engages the cutting edge of the flute to push the adhered material from the flute of the rotating drill.

INTENT OF THE DISCLOSURE

Although the following disclosure offered for public dissemination is detailed to insure adequacy and aid in understanding of the invention, this is not intended to prejudice that purpose of a patent which is to cover each new inventive concept therein no matter how it may later be disguised by variations in form or additions of further improvements. The claims at the end hereof are intended as the chief aid toward this purpose, as it is these that meet the requirement of pointing out the improvements or methods in which the inventive concept is found.

There has been chosen a specific embodiment of the flute cleaner and showing a preferred means for cleaning the flutes of a twist drill while the drill is held in a drill press and is rotating. This specific embodiment has been chosen for the purposes of illustration and description as shown in the accompanying drawings.

BRIEF DESCRIPTION OF THE DRAWINGS

FIG. 3 represents an isometric view of the flute cleaning tool of this invention and showing the tool as it is used to remove the accumulated chips from the flutes of the twist drill.

In the following description and in the claims various details will be identified by specific names for convenience; these names, however, are intended to be generic in their application. Corresponding reference characters refer to like members throughout the several figures of the drawings.

The drawings accompanying, and forming part of, this specification disclose certain details of construction for the purpose of explanation of the broader aspects of the invention, but it should be understood that structural details may be modified in various respects without departure from the concept and principles of this invention and may be incorporated in other structural forms than that shown.

DESCRIPTION OF THE PREFERRED EMBODIMENT

Figure 1:
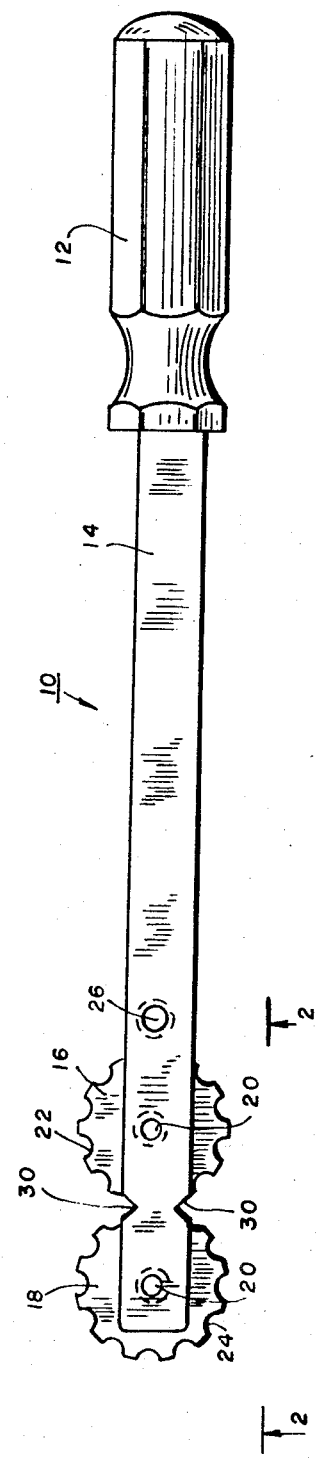
FIG. 1 represents a plan view of the hand-held flute cleaning tool of this invention, the view being substantially three-quarters the full size of a preferred embodiment.
Figure 2:
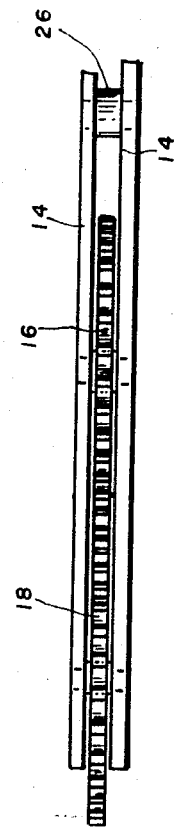
FIG. 2 represents an enlarged side view showing the front portion of the rotatable scraper members as maintained in a support beam portion of the tool, the view looking in the direction of the arrows and on the line 2—2 of FIG. 1.

Referring now in particular to the hand-held flute cleaning tool as seen in FIGS. 1 and 2 it is to be noted that the cleaning tool as an assembly is identified as 10 and includes a handle 12 which may be of molded plastic. Mounted in this handle is a pair of arms or beams 14 which may be of strip metal such as steel. Rotatably mounted in the outer ends of the arms are a pair of disc-like members 16 and 18 which are maintained in freely rotatable condition between the spaced arms 14 by means of axles or pins 20 which are a press-fit or are riveted in holes formed in both the upper and lower arms 14. The axles are sized so as to permit the cleaning discs 16 and 18 to freely rotate on the axles. A spacing pin 26 which may also have its outer ends swayed to act as a rivet is also used to establish and maintain a determined spacing between the arms 14. This determined space relationship between the inner surfaces of the arms 14 provides retaining guide means for the rotation of the discs 16 and 18. The discs 16 and 18 are also positioned in arms 14 so as to barely pass one another as they are rotated. A notch 30 provides a seat in the beam between the two rotatable discs to provide a supporting seat for the drill as its flutes are scraped. This notch 30 is of determined size to accommodate drills having diameters falling within determined limits. A notch is preferably provided on each side of the beam, each notch being equally positioned between the retaining axles 20.

Referring next and finally to the use illustration of FIG. 3 it is to be noted that the tool 10 is grasped or gripped by its handle 12 in a hand 40 as shown in phantom outline. A twist drill 42 is held or retained in a chuck 44 of a drill press not shown. This drill is shown as being rotated in the direction of the arrow so that as the twist drill is rotated by the drill press the flute cleaning tool 10 is caused to be brought against the periphery of the twist drill. The cutouts 22 and 24 of the discs 16 and 18 are semi-circular in configuration and are spaced and sized so that the cutting edge portion of the drill can enter a cutout of a disc. The sharp cutting edge of the drill may lightly penetrate the soft metal of the disc as the flute cleaner is moved up and down the drill. The protruding portion of the disc enters the flute to engage a chip 46 and to push the chip from the drill.

USE AND OPERATION OF THE FLUTE CLEANING TOOL

As reduced to practice, it has been found that the size of the cleaning discs 16 and 18 are preferably made in differing diameters depending on the diameter of the drill being cleaned. A pair of cleaning discs each having a diameter such as 1¼ inches may have 14 cutouts in their peripheries. The V-notch 30 may be three-sixteenths of an inch deep. This cleaner may have a preferred range for cleaning drills of one-quarter to one-half inch in diameter. Larger drills would preferably have discs of larger diameter and deeper cutouts while smaller drills would require smaller diameter discs and much smaller and more closely spaced cutouts.

With a flute cleaner of a selected size, it is assumed that the drill is mounted in the spindle of a drill press or the like. With the spindle rotating in the customary manner the flute cleaner 10 is brought to the drill near or adjacent the chuck 44. With the drill seated in the notch 30 a cutting edge portion of the drill enters a cutout in one of the cleaning discs so that the protruding lobe portion of the disc is in the flute of the drill until this flute portion approaches and enters the notch 30 of the arms 14. At this position the flute of the drill has moved from one cleaning disc and is about to move into cleaning engagement with the other disc. As the drill is rotated at the normal selected drilling speed, the flute is successively entered by lobed portions of one or the other cleaning discs. As the cleaner is moved down the drill toward its point, the chip is engaged and is pushed from the flute. The flute cleaner may then be moved in the other direction to clean on its "up" stroke. A few "up" and "down" strokes are usually all that are required to clean the chips from the drill.

As the cleaning disc members are freely rotatable the wear of the tool in use is surprisingly light. The disc members are made of soft metal or the like so that as the sharp cutting edge of the drill is brought into engagement with the cleaner disc the cutting edge of the drill is not dulled. The disc member of course could be made of plastic, pressed fiber or other known or to be developed materials just so that the cleaning disc is sufficiently stiff to act as a scraping member while having a flute engaging surface sufficiently softer than the drill so as to not dull the cutting edge of the drill being cleaned.

Although the preferred embodiment shown has the discs 16 and 18 disposed in the same plane it is of course to be contemplated that the discs can be mounted on a pair of pins 20 and supported so that their peripheries overlap. For example, beams 14 could be moved apart and washers of a thickness slightly greater than a disc be provided to move these discs into parallel adjacent planes. The pins 20 then would be positioned from each other so that the peripheries of the discs to overlap thus bringing the thus formed receiving troughs to or toward the longitudinal edges of the beams 14.

Terms such as "left," "right," "up," "down," "bottom," "top," "front," "back," "in," "out" and the like are applicable to the embodiment shown and described in conjunction with the drawings. These terms are merely for the purposes of description and do not necessarily apply to the position in which the flute cleaner for twist drills may be constructed or used.

The conception of the flute cleaner and its many applications is not limited to the specific embodiment shown but departures therefrom may be made within the scope of the accompanying claims and without sacrificing its chief advantages and protection is sought to the broadest extent the prior art allows.

What is claimed is:

1. A flute cleaner for removing adhered material and chips from the face of the flutes of twist drills, said flute cleaner including: (a) an arm member; (b) a pair of cleaning discs of material softer than hardened steel such as aluminum, plastic and the like, said discs freely and rotatably carried in a side-by-side arrangement by and on a pair of axle members mounted on said arm member, the discs in mounted condition spaced so as to provide a trough support for the fluted area of a drill of determined size when the discs are held thereagainst, and (c) a plurality of spaced cutouts each formed of a like semi-circular configuration in the periphery of each disc, the semi-circular cutouts disposed to receive and engage a cutting edge and face of the flute of a drill when the discs are pressed against the flutes of the drill and as the discs are moved along the drill to engage the flute at the cutting edge to scrape said accumulated material and chips from the outer face of the flute of the drill.

2. A flute cleaner as in claim 1 in which the pair of cleaning discs are carried by said arm so as to extend beyond opposite sides of the arm an amount sufficient to permit the pair of disc portions extending from either side of the arm to be selectively pressed against the flute of the drill.

3. A flute cleaner as in claim 1 in which the discs are disposed in a common plane and in which the perimeters of the discs nearly touch each other.

4. A flute cleaner as in claim 3 in which there is provided a seating recess in the arm member, said recess positioned midway of the discs and providing a guide and seat for receiving the rotating drill.

5. A flute cleaner as in claim 1 in which the cutouts in the periphery of the discs are spaced so as to successively engage the cutting edges of the flutes of a twist drill.

6. A flute cleaner as in claim 1 in which the cleaning discs are disposed midway of the width of the arm and near the outboard end of the arm.

* * * * *